(12) United States Patent
Poon

(10) Patent No.: US 6,550,932 B2
(45) Date of Patent: Apr. 22, 2003

(54) REMOTE CONTROL HAND LANTERN

(75) Inventor: Tit Wing Poon, Fo Tan (CN)

(73) Assignee: Flying Dragon Electrical Appliances Ltd., Shatin (CN)

( * ) Notice: Subject to any disclaimer, the term of this patent is extended or adjusted under 35 U.S.C. 154(b) by 0 days.

(21) Appl. No.: 10/117,644

(22) Filed: Apr. 5, 2002

(65) Prior Publication Data

US 2003/0039117 A1 Feb. 27, 2003

(30) Foreign Application Priority Data

Aug. 24, 2001 (HK) .......................................... 01105981

(51) Int. Cl.[7] .................................................. F21L 4/04
(52) U.S. Cl. ........................ 362/188; 362/394; 362/372
(58) Field of Search ................................ 362/186, 162, 362/181, 203, 188, 306, 372, 394, 395, 221, 222, 233, 260, 276, 295, 362, 294, 373, 285, 418

(56) References Cited

U.S. PATENT DOCUMENTS 5,192,126 A * 3/1993 Remeyer et al. ............ 362/184
D421,660 S * 3/2000 Shing
6,394,630 B1 * 5/2002 Skidmore et al. ........... 362/394

FOREIGN PATENT DOCUMENTS

GB 2090396 A * 7/1982
JP 408084654 A * 4/1996

* cited by examiner

Primary Examiner—Thomas M. Sember
Assistant Examiner—Hargobind S. Sawhney
(74) Attorney, Agent, or Firm—Alix, Yale & Ristas, LLP

(57) ABSTRACT

A remote control hand lantern includes a hand-held remote control transmitter and a remote control receiving triggering circuit installed within the lantern base. A trestle of the lantern base includes a light-source support and light-source socket. Fixed contacts are provided on both sides of the lower part of the light-source support. Mobile contacts corresponding to the fixed contacts are provided on both sides of the light-source socket. The fixed and mobile contacts form a contacting style circuit switch which serially connects a power-source to a remote control receiving triggering circuit. The output of the remote control receiving triggering circuit is connected to the light-source pin of the light-source socket. The hand lantern has waterproof and expanded-contracted remote control switch on-off functions.

5 Claims, 9 Drawing Sheets

REMOTE CONTROL HAND LANTERN

BACKGROUND OF THE INVENTION

This invention relates generally to hand lanterns. More particularly, the present invention relates to remote controlled hand lanterns.

Hand lanterns have a plurality of styles. There are waterproof hand lanterns, and also expandable-contractible hand lanterns. One such lantern is disclosed in Hong Kong Patent No. UHCX3506, titled "Hand Lantern". The structure of this hand lantern, which can be floating, waterproof and expanded-contracted, is shown in FIG. 1. The lantern includes a base 1, a moveable cover 2, a trim cover 3, a lantern top shade 4, a handle 5, a lantern base trestle 7, and a connecting ring 9. The base 1 forms the lower part of the shell of the hand lantern and is a double deck, sheath-fitting, barrel-shaped structure. The double deck wall is formed by outer-sleeve 1-1 and inner-sleeve 1-2. The moveable cover 2 is positioned in the double deck wall and can be pulled out and pushed in along double deck wall. The side wall of the moveable cover 2 is composed of transparent material. A ventilating hole 2-6 is opened at the top of the moveable cover 2. The lantern top shade 4 is installed at the top of the moveable cover. Handle 5 is moveably connected to the lantern top cover 4 by a hole 4-1 extending therethrough. Lantern base trestle 7 is moveable up and down within a hole in the middle of top cover of base 1. Connecting ring 9, installed on outer side of upper part of the base 1, prevents moveable cover 2 from sliding out from double deck wall after positioning within the double deck wall.

The hand lantern also has a waterproof ring 6 in a groove on the outer side of lower part of the moveable cover 2 to provide water-resistance to the lantern. A copper plate 7-3, connected to the light bulb, is installed on lantern base trestle 7 and a copper plate 1-5 is provided under the upper cover of the base 1. Base 1, moveable cover 2, lantern base trestle 7 and spring 8 form a connecting style circuit switch. When moveable cover 2 is pulled out, the lantern base trestle 7 is pushed to the highest position under the biasing force of spring 8. The copper plate 7-3 on the lantern base trestle 7 contacts the copper plate 1-5 under the upper shade of the base completing the circuit and the light bulb is switched on. When moveable cover 2 is pushed down, the lantern base trestle 7 is pressed down by the top cover of the moveable cover 2 and copper plate 7-3 is disconnected from copper plate 1-5, switching off the light bulb is switched off. However, it has been found that a remote control device would facilitate use of the lantern, especially when the lantern is hanged in a higher or farther place during use.

A remote controllable hand lantern with multi column-shaped fluorescent lamp serving as light-source is disclosed in the U.S. Pat. No. 5,192,126, titled "Remote Control Fluorescent Lantern". This lantern includes a lantern shade and a top cover at the top of the lantern shade. A base supports the lantern shade and top cover. A fluorescent lamp is installed within lamp shade. The lantern shade, base, and top cover are integrated together by a removable device. A bracket provided on the removable device is positioned close to the fluorescent lamp. To facilitate installation of the fluorescent lamp, a horizontal support is provided to keep the working position of the fluorescent lamp within the lamp shade. An upper electrical contacting device installed on the top cover connects the upper end of the fluorescent lamp with the electrical circuit. A lower electrical contacting device installed on the base connects the lower end of the fluorescent lamp with electrical circuit. A remote control system includes a radio frequency generator with coded pulse generator, used to receive hand-control input instruction coming from the controlling switch and to transform it into a coded pulse signal. The transmitter has a modulator for modulating the coded pulse signal into a radio frequency carrier signal. A transmitting antenna transmits the modulating radio frequency signal. The transmitting system includes a radio frequency receiving device to receive the radio frequency signal transmitted by above-mentioned transmitter and transforms the radio frequency signal into a control signal. The receiving device installed within the base includes a receiving antenna for receiving the modulating radio frequency signal transmitted from the transmitter. The receiving antenna and above-mentioned removable device are integrated. The receiver includes a demodulator for demodulating the radio frequency signal into a coded pulse output. The receiver includes a decoder, which transforms the coded pulse output into a control signal, and a controlling unit which receives the control signal and operates the fluorescent lamp. This fluorescent hand lantern does not have waterproof ability and can not be expanded-contracted to reduce the volume during transport.

The hand lantern of the Hong Kong patent cannot be readily modified to include the remote control device or the fluorescent lamp of the U.S. patent, the lamp base and expanded-contracted switch device of the hand lantern being unsuitable for such modification.

SUMMARY OF THE INVENTION

Therefore, the subject invention solves the above-mentioned insufficiency of the conventional technology and provides a remote control hand lantern which has both waterproof ability and an expanded-contracted remote control switch.

A remote control hand lantern in accordance with the invention includes a base having a bottom and a double-deck wall sheath-fitting barrel-shaped structure. A moveable cover installed in the double-deck wall can be pulled out and pushed in along double-deck wall. A lantern top shade is installed at the top of moveable cover and a handle is movably connected with lantern top shade. A trestle with a transparent bladder-like sleeve is movable up and down within a hole in the middle of the upper cover of the base. A spring under the trestle and positioned in a spring cup of the base contacts a circuit switch formed by the base, moveable cover, trestle and spring. The power-source and circuit board of the remote control receiving triggering circuit are mounted within a chamber on the outer side of the base proximate to the spring cup. A light-source support is disposed in an upper part of the trestle and a light-source socket is disposed in a lower part of the trestle, with the light-source support being moveable up and down through the middle hole of top cover. A fixed contact is provided on both sides of the lower part of light-source support. Mobile contacts corresponding to the fixed contacts are carried on the light-source socket. A contacting style circuit switch formed by the base, the moveable cover, the fixed contact, the mobile contact, and the spring is serially connected between the power-source and the remote control receiving triggering circuit. The output of remote control receiving triggering circuit is connected with the light-source pin of the light-source socket. A remote control transmitting device and receiving triggering device is also provided.

A base ventilating hole extending through the bottom of the base ventilating hole may be closed with a plug.

The above-mentioned remote control receiving triggering circuit includes a remote control receiver and a triggering circuit, in which the triggering circuit includes a triggering switch circuit and the electronic ballast of fluorescent lamp.

The above-mentioned remote control transmitter and remote control receiver are a radio frequency remote control transmitter and a radio frequency remote control receiver.

The power-source is a direct current power source, installed on outer side of spring cup of the base, the direct current power source being connected with the contacting style circuit switch through a choke coil.

The radio frequency transmitter includes a power-source, a transmitter button switch, a modulator, a radio frequency oscillator, and an antenna, in which the power-source is connected with the modulator through the button switch of transmitter, the output of modulator is connected with the base electrode of the oscillating transistor of the radio frequency oscillator, changing direct current into radio frequency signal modulated by low frequency signal, transmitted by the transmitting antenna.

The radio frequency remote control transmitter includes a tuned circuit of antenna, a radio frequency amplifier, a super regenerated oscillating selector, an operational amplifier and a demodulator, in which the tuned circuit of the antenna is connected with the radio frequency amplifier, the output of the radio frequency amplifier is connected with the super regenerated oscillator, gaining a radio frequency signal same as the transmitted signal, the output of the super regenerated oscillating selector is connected with the triggering circuit after connecting the operational amplifier and the demodulator, the output of triggering circuit is connected with the light-source through the light-source socket.

The light-source is a U-shaped, high efficiency and energy saving lamp.

The advantages of the subject invention are that the hand lantern not only can be waterproof but also has an expanded-contracted switch, and provided with remote control transmitting-receiving device, can remote control the switch of hand lantern; easy to use, saving electrical energy.

BRIEF DESCRIPTION OF THE DRAWINGS

In order to understand structure, characteristic of the subject invention and its function further, an embodiment will be explained in detail with company drawings as follows.

DETAILED DESCRIPTION OF THE PREFERRED EMBODIMENT

Figure 1:
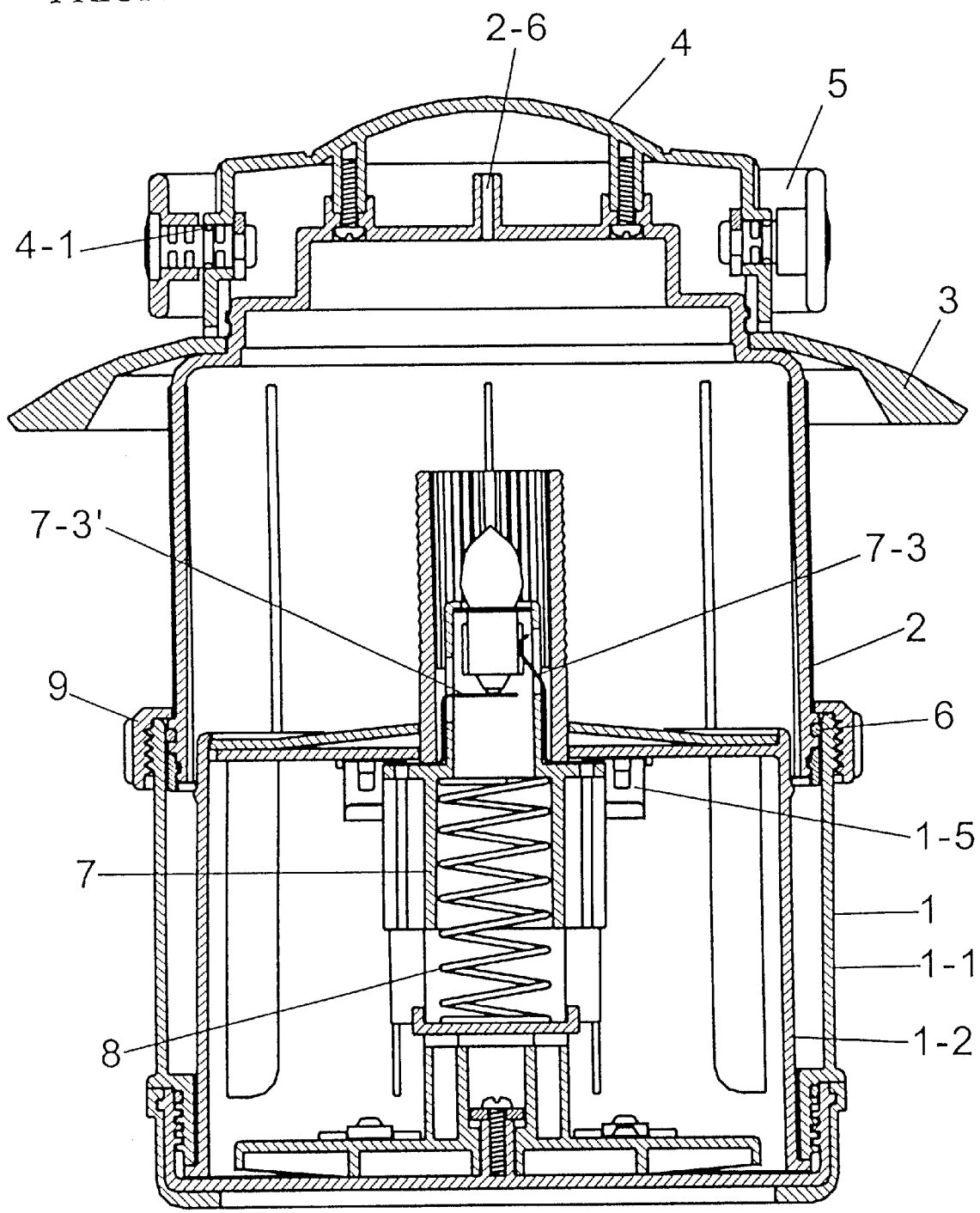
FIG. 1 is a cross-sectional view of a prior art hand lantern which can float and is waterproof and also has expanded-contracted switch.
Figure 2:
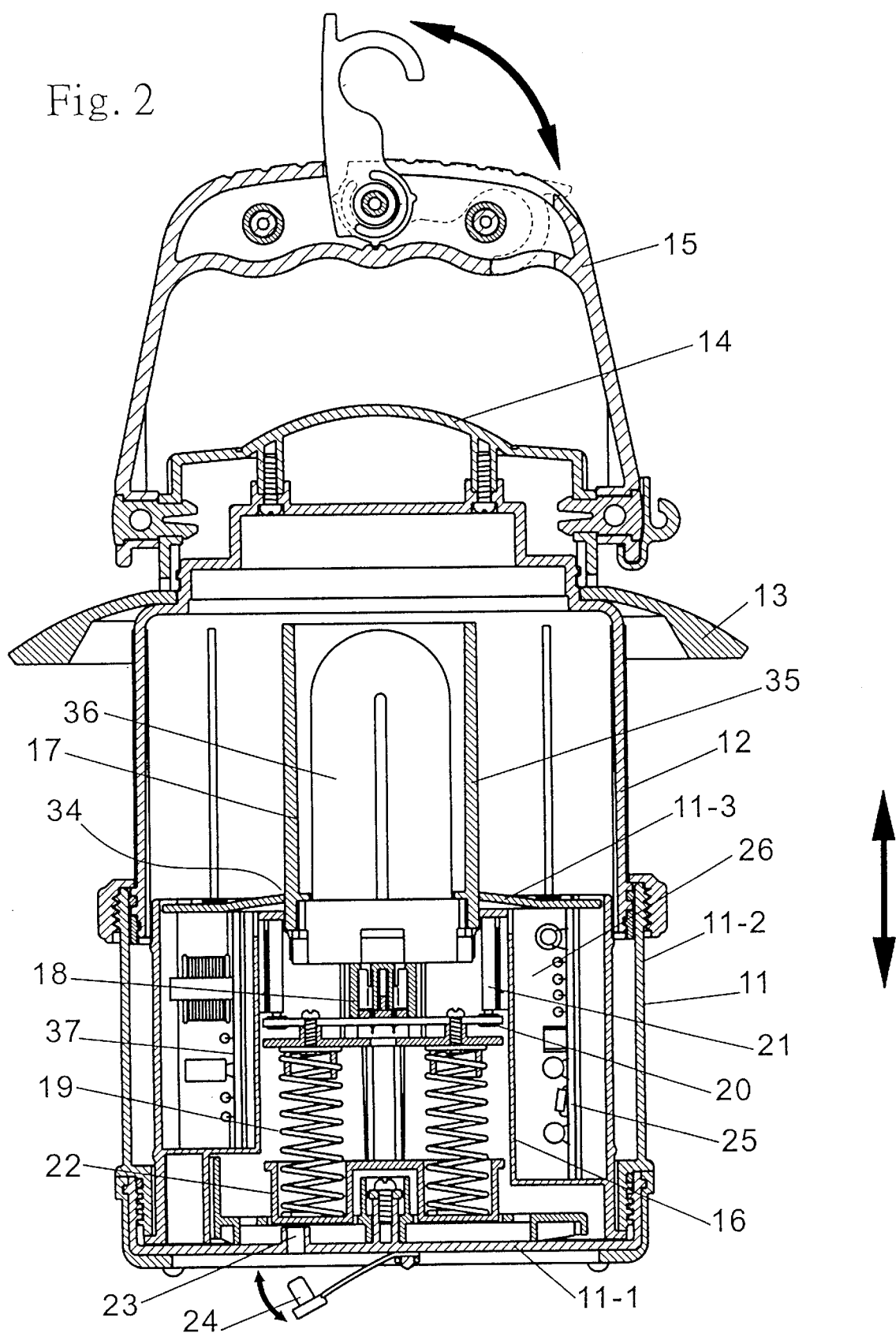
FIG. 2 is a cross-sectional view of remote control hand lantern in accordance with the invention, shown with the moveable cover, light-source support, light-source socket, and mobile contacts in the on position.
Figure 3:
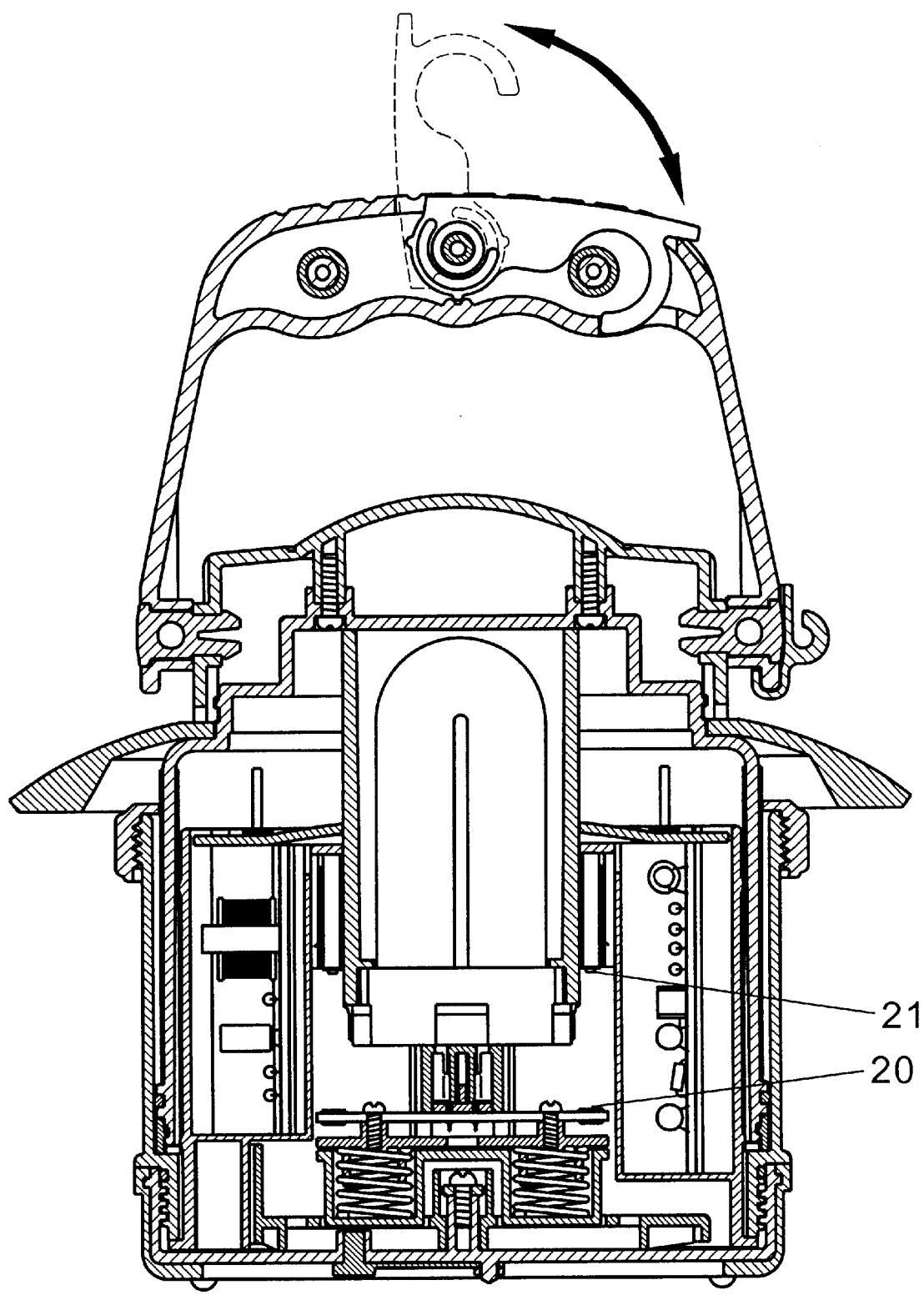
FIG. 3 is a cross-sectional view of the remote control hand lantern of FIG. 2, shown with the moveable cover, light-source support, light-source socket, and mobile contacts in the on position.
Figure 4:
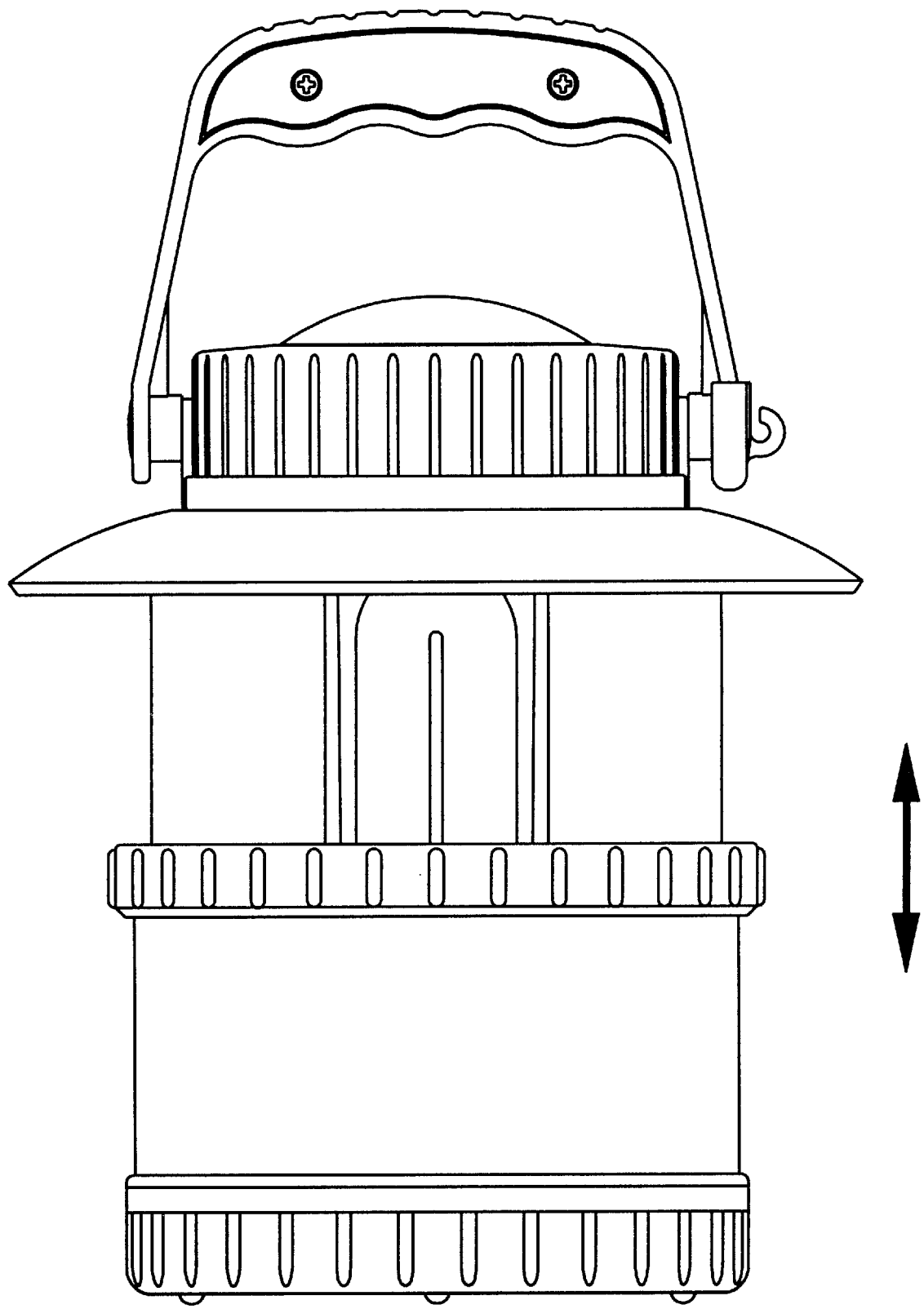
FIG. 4 is a front view of the remote control hand lantern of FIG. 2, shown with the moveable cover in the on position.
Figure 5:
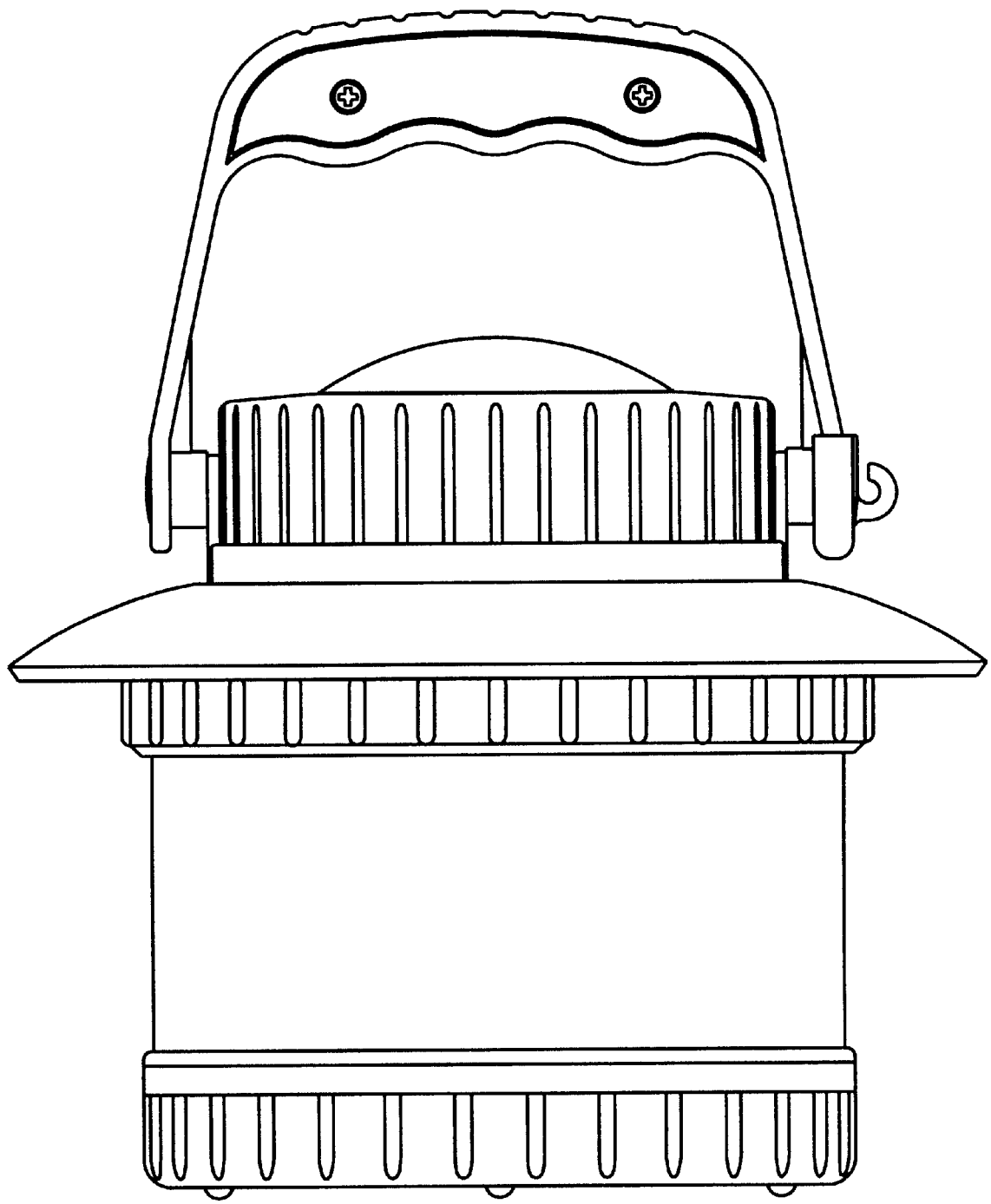
FIG. 5 is a front view of the remote control hand lantern of FIG. 2, shown with the moveable cover in the off position.

Shown in FIGS. 2 and 3 is a remote control hand lantern in accordance with the invention which comprises a base 11 with a bottom 11-1 and a double wall, cylindrical structure 11-2. A moveable cover 12 is installed in the double wall and can pulled out and pushed in along the double wall. A trim cover 13 and lantern top shade 14 are installed at the top of moveable cover. A handle 15 is movably connected to the lantern top shade. A lantern base trestle extending through a middle opening 34 in the upper cover 11-3 of the base is movable up and down and has a transparent sleeve 35. A spring 19 is positioned in lower part of lantern base trestle with a lower portion being disposed in a spring cup 22 of the base. A contacting style circuit switch is formed by base 11, moveable cover 12, the lantern base trestle, and spring 19.

An inner wall 16 forms a chamber 26 intermediate the spring cup 22 and the double wall structure 11-2. A power-source 37 and the circuit board 25 of the remote control receiving triggering circuit are installed in the chamber 26.

The lantern base trestle comprises light-source support 17 and light-source socket 18. The upper part of light-source support 17 extends through middle opening 34 of upper cover 11-3 of the base 11 and is movable up and down. A fluorescent lamp 36 is inserted in the light-source socket 18, which is located in the lower part. Fixed contacts 21 are provided on both sides of the lower part of the light-source support 17 and mobile contacts 20 corresponded to the position of fixed contacts 21 are provided on both sides. A contacting style circuit switch is formed by base 11, moveable cover 12, the fixed contacts 21 of light-source support 17, the mobile contacts 20 of light-source socket 18, and spring 19. The contacting style circuit switch is connected serially between the power-source and the remote control receiving triggering circuit. The output of the remote control receiving triggering circuit is connected with the light-source pin of the light-source socket.

A ventilating hole 23 extends through the bottom of the base 11. A ventilating hole plug 24 is provided to close hole 23.

Figure 6:
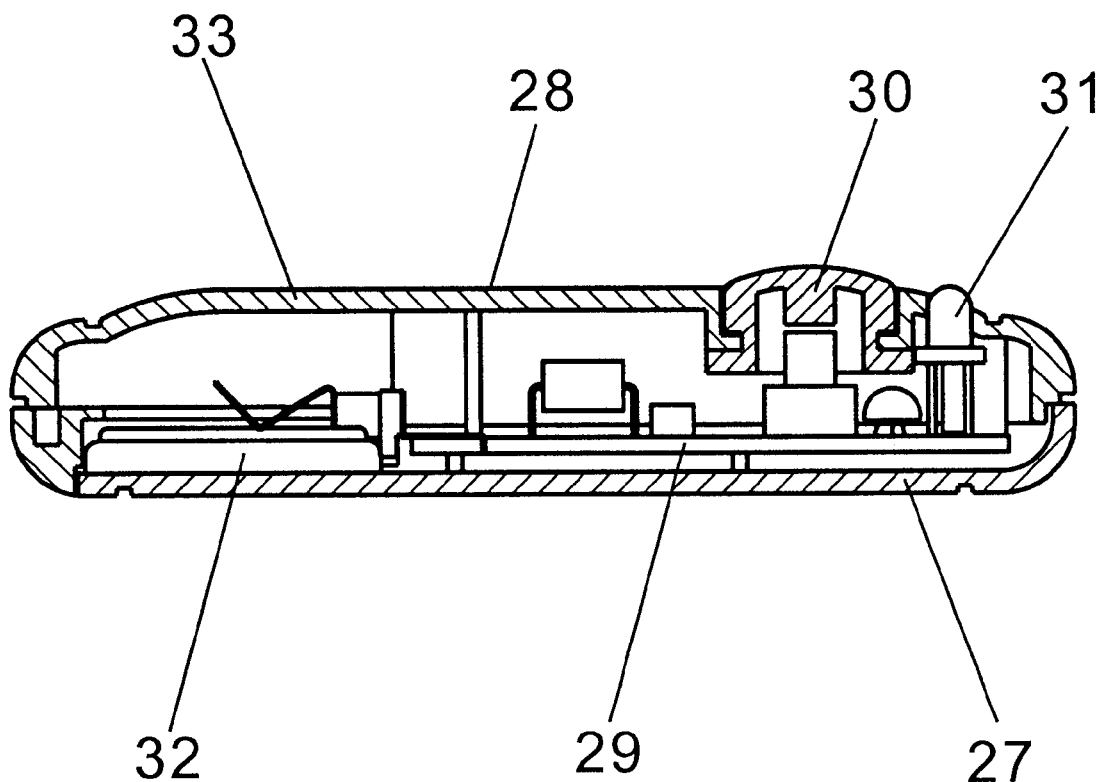
FIG. 6 is a cross-sectional view of a remote control transmitter for the remote control hand lantern of FIG. 2.

A hand-held remote controller, shown in FIG. 6, comprises a battery 32 and a transmitter circuit board 29 disposed within a housing 28 formed by upper and lower covers 33, 27. A button switch 30 and an indicating lamp 31 extend from the upper cover 26.

Figure 8:
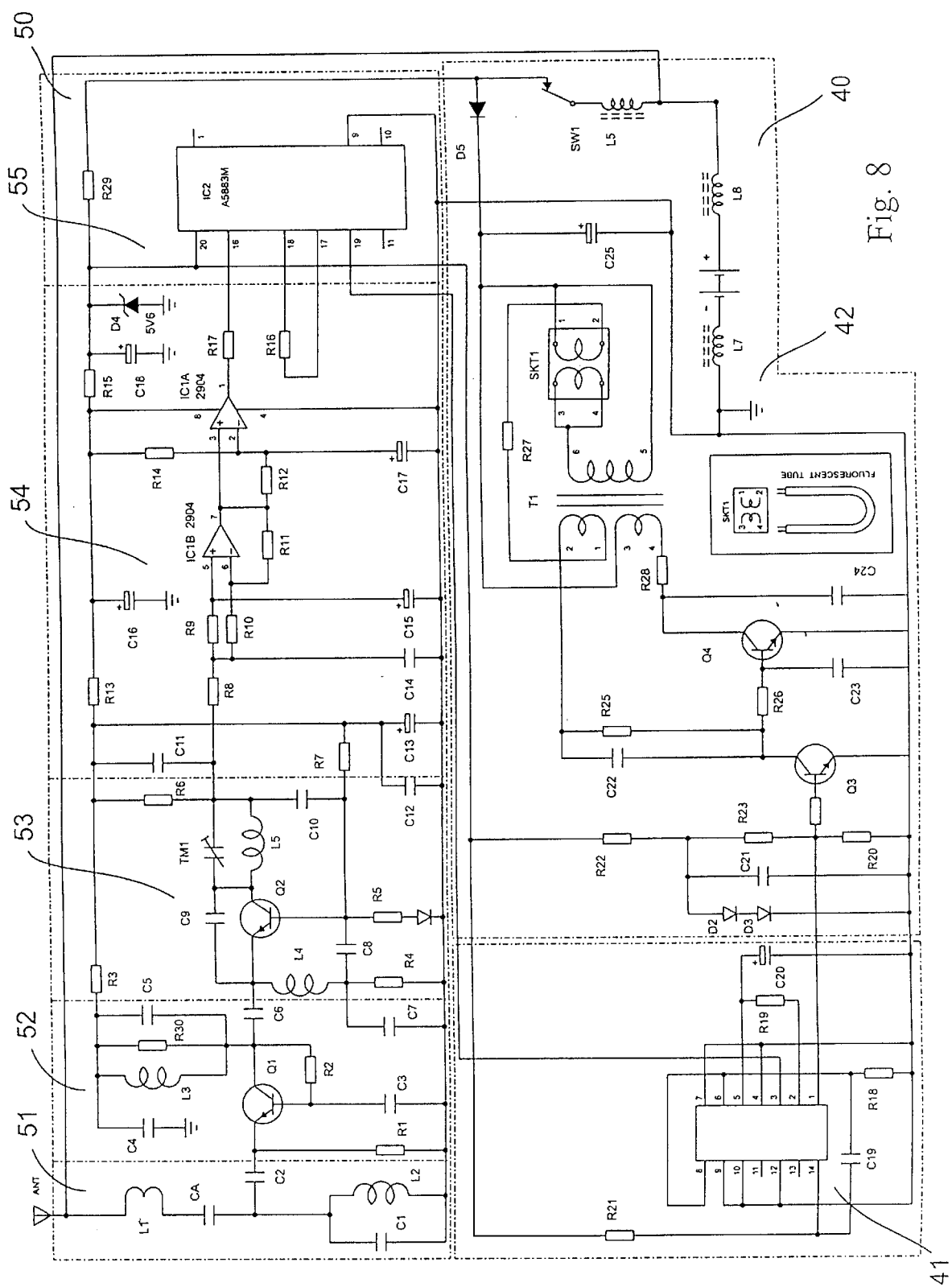
FIG. 8 is a circuit diagram of a remote control receiving triggering circuit of the remote control hand lantern of FIG. 2.

As shown in FIG. 8, the power-source within chamber 26 is a direct current power-source which is connected with contacting style circuit switch through a choke coil.

Figure 7:
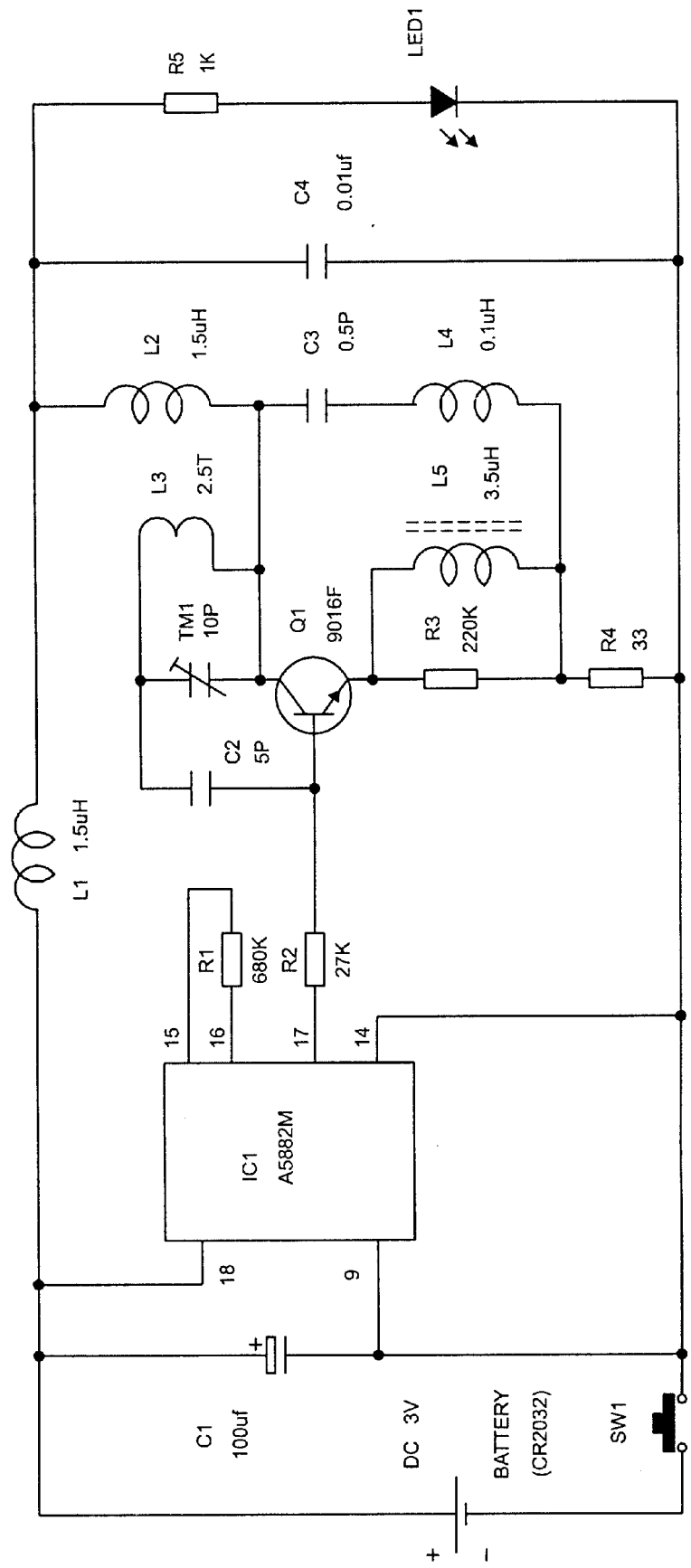
FIG. 7 is a circuit diagram of the remote control transmitter of FIG. 6.
Figure 9:
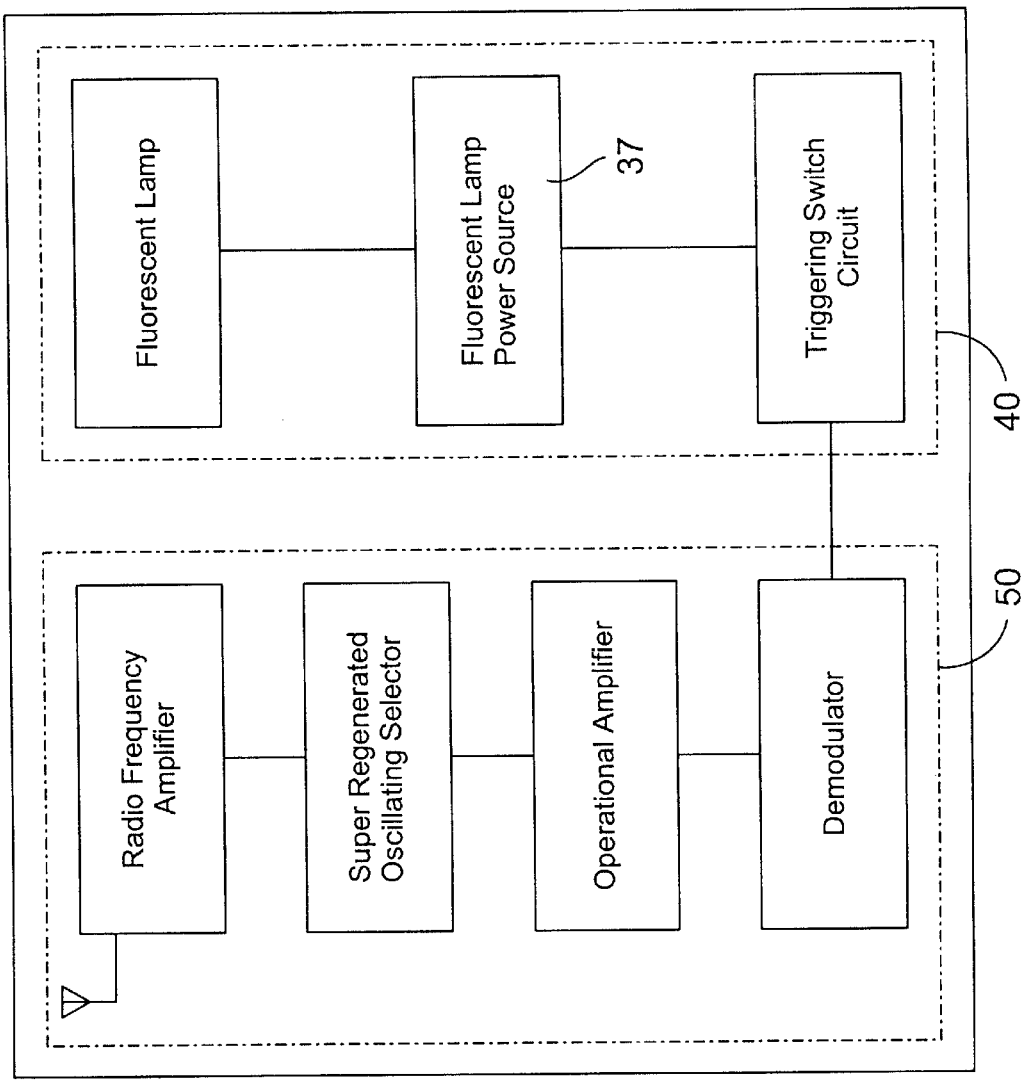
FIG. 9 is a block diagram of the circuits of the remote control transmitter and remote control receiving triggering circuits of FIGS. 7 and 8.
Figure 9:
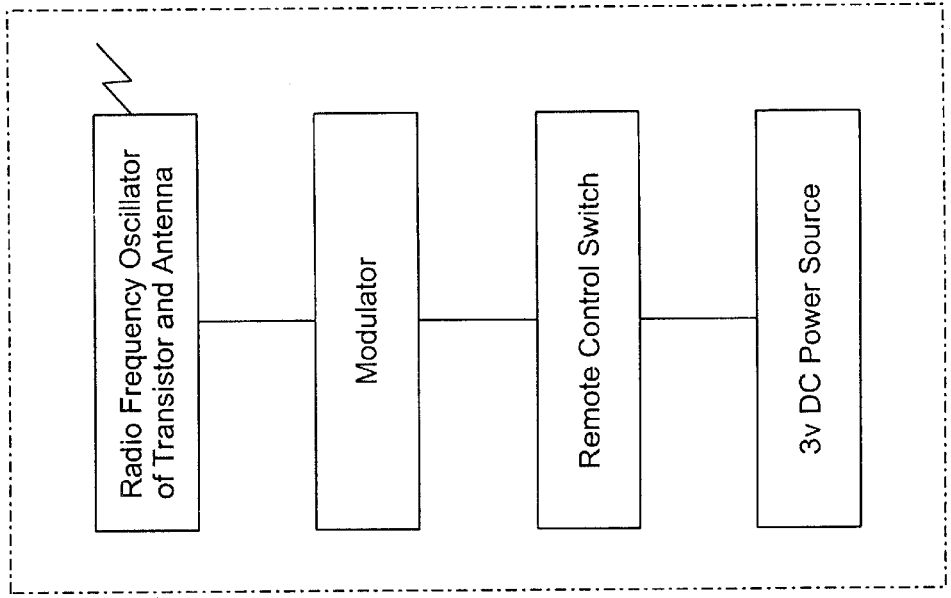

Referring to FIGS. 7, 8 and 9, the remote control transmitter and remote control receiver of the subject invention are radio frequency remote control transmitters and radio frequency remote control receivers. The remote control receiving triggering circuit comprises a remote control receiver 40 and a triggering circuit 50, with the triggering circuit 50 including a triggering switch circuit and the electronic ballast of the fluorescent lamp.

The circuit of the radio frequency transmitter comprises a power-source, a modulator, a radio frequency oscillator, and an antenna. The 3 volt direct current power-source is connected with the modulator through button switch SW1 of the transmitter. Pressing the switch once turns the circuit on, pressing once again turns the circuit off. The modulator comprises an integrated circuit ICI of type A5582M. The output frequency of modulator is between 3 KHz and 3.5 KHz, and nil-modulation or modulation is selected arbitrarily. The output of modulator is connected with the base electrode of the oscillating transistor of the radio frequency oscillator, transforming direct current into a radio frequency signal modulated by a low frequency signal. The output radio frequency signal is transmitted by the transmitting antenna. The frequency of the radio frequency is 320 MHZ.

The radio frequency remote control receiver comprises an antenna tuned circuit 51, a radio frequency amplifier 52, a super regenerated oscillating selector 53, an operational amplifier 54, and a demodulator 55. The antenna tuned circuit 51 is connected with the radio frequency amplifier 52, formed by transistor Q5. The output of the radio frequency amplifier 52 is connected with the super regenerated selector 53, formed by transistor Q2, gaining a radio frequency signal which is the same as the transmitting signal. The output of the super regenerated selector 53 is connected with the operational amplifier 54, which includes IC1B and IC1A. The output of operational amplifier 54 is connected with the integrated demodulator IC2 (the type of the demodulator IC2 is A5883M). The output of demodulator is connected with triggering circuit 40. The output of triggering circuit 40 is connected with the light-source socket. The triggering circuit comprises a triggering switch circuit 41 and the ballast 42 of fluorescent lamp. The triggering circuit 41 formed by an integrated trigger of type TC4013, with its output connected with the electronic ballast 42, comprised of Q3, Q4 and a high-frequency raising transformer. The output of the electronic ballast 42 is connected with the fluorescent lamp.

The remote control transmitter is a type FRF (TX) and the remote control receiver is a type FRF384U, both of which are products sold in the market.

During use, the contacting circuit switch of the hand lantern is bypassed by pressing button switch 30 on the upper cover of the remote control transmitter (FIG. 7). The transmitter is thereby activated to transmit a radio frequency signal having a predetermined frequency (preferably 320 MHZ). The remote control receiver 40 installed-in the hand lantern receives the radio frequency signal through the antenna, actuating triggering switch circuit 41 and ballast 42 to energize the light. Pressing button switch 30 again causes the light to be switched off.

What is claimed is:

1. A remote control hand lantern comprising:
    a base having a bottom, an upper cover, a cylindrical double-wall structure extending between the bottom and the upper cover; a cup disposed within the double wall-structure, and extending upwardly from the bottom; an inner wall disposed within the double-wall structure; the upper cover defining an opening; the inner wall defining a chamber; the bottom defining a ventilating hole extending therethrough;
    a moveable cover having an upper portion and a lower portion disposed within the double-wall structure; the moveable cover being moveable between an out position and an in position;
    a lantern top shade mounted to the upper portion of the moveable cover;
    a handle movably connected with lantern top shade;
    a trestle comprising upper and lower portions; the upper portion including a transparent sleeve, a light-source support, and a plurality of fixed contacts; the sleeve being movable up and down through the opening in the upper cover of the base; the fixed contacts being mounted on a lower part of the light-source support; the lower portion including a light-source socket and a mobile contact corresponding to each fixed contact; the light-source socket having a light-source pin;
    a light source having segment inserted within the light-source socket;
    a spring disposed in the lower part of the trestle and the groove of the bottom of the base; the base, the moveable cover, the trestle and the spring defining a contacting circuit switch;
    a remote control transmitting device;
    a receiving triggering device disposed within the chamber of the base, the receiving triggering device being in electrical communication with the light-source pin of light-source socket;
    a power source disposed within the chamber of the base; and
    a plug adapted for closing the ventilating hole of the base;
    wherein the base, the moveable cover, the fixed contacts, the mobile contacts, and spring define a contacting circuit switch; the contacting circuit switch being serially connected between the power-source and the remote control receiving triggering circuit.

2. The remote control hand lantern of claim 1 wherein:
    the remote control transmitting device comprises a radio frequency remote control transmitter including a power-source, a button switch, a modulator, a radio frequency oscillator, and an antenna in electrical communication with the radio frequency oscillator; the button switch selectively providing direct current from the power-source to the modulator; the radio frequency oscillator including a transistor having a base in electrical communication with the modulator; the oscillator varying the direct-current into a radio frequency signal modulated by a low frequency signal; and
    the receiving triggering device comprises a remote control triggering circuit including a radio frequency remote control receiver and triggering circuit; the radio frequency remote control receiver comprising an antenna tuned-circuit, a radio frequency amplifier, a super re-generating oscillation selector, an operational amplifier, and a demodulator; the antenna tuned-circuit being in electrical communication with the radio frequency amplifier; the radio frequency amplifier being in electrical communication with the super re-generating oscillator; the super re-generating oscillator being in electrical communication with the operational amplifier; the operational amplifier being in electrical communication with the demodulator; the demodulator being in electrical communication with the triggering circuit; and the triggering circuit being in electrical communication with the socket of the light-source.

3. The remote control hand lantern of claim 1 wherein the triggering circuit comprises a triggering switch circuit and an electronic ballast for the fluorescent lamp.

4. The remote control hand lantern of claim 1 wherein the power-source is a direct-current electrical source connected with the contacting circuit switch through a choke coil.

5. The remote control hand lantern of claim 1 wherein the light-source is a high efficiency, energy saving, U-shaped fluorescent lamp.

* * * * *